Patented Oct. 3, 1939

2,174,886

UNITED STATES PATENT OFFICE 2,174,886

PLASTIC RESINOUS CEMENT

Edwin F. Kiefer, Cleveland, Ohio, assignor to National Carbon Company, Inc., a corporation of New York No Drawing. Application September 23, 1936, Serial No. 102,256

7 Claims. (Cl. 260—67)

The invention relates to composite articles and, more specifically, is a composite article comprising two or more pieces of carbon bonded by a furan resin cement.

I have found that a liquid furan of the group consisting of furfural and furfuryl alcohol, or mixtures thereof, when admixed with a suitable catalyst which promotes resinification of the furan, is admirably suited for use as a cement for carbon articles, and especially for uniting porous baked carbon articles with the furan resin-impregnated articles described in my copending application Serial No. 102,257, filed September 23, 1936.

A mixture of furfuryl alcohol or furfural, or a mixture of these two furans, with about 5% to 10% by volume of a catalyst such as sulfur chloride is, when first prepared, a very thin fluid. When allowed to stand, such a mixture of furan and catalyst slowly forms a resinous material, and the viscosity of the mixture gradually increases as resinification progresses. There is a wide range of partial resinification within which the furan is sufficiently viscous, and yet sufficiently plastic, that it can be readily applied to carbon articles with a trowel. The resinification is accelerated at elevated temperatures, and it is usually convenient to carry the initial partial resinification of the material to the required stage by heating it to a temperature of about 55° to 70° C. for about five to thirty minutes.

Further resinification of this partially polymerized furan resin develops at room temperature until, in about ten to twenty hours, the resin takes on a permanent set and loses its thermoplastic properties. In a further period of from about four to twenty-four hours resinification is completed with the formation of an infusible, impervious, substantially rigid resin. The later stages of resinification are likewise accelerated at elevated temperatures, and it is sometimes advantageous to complete the set of the cement-bonded structure by heating it to a temperature of from about 60° to 225° C., in which case the resinification is usually complete within a few hours.

A preferred procedure in the preparation and use of the resinous cement of the invention is to heat a mixture composed of about 10 parts of furfuryl alcohol or furfural, or a mixture thereof, and about 1 part of sulfur chloride, at a temperature of from about 55° to about 70° C. until a thermoplastic resinous furan is formed. The resinous material thus formed is then cooled, preferably to below 30° C., to inhibit further resinification while it stands ready for use. Subsequently, the thermoplastic resinous material may be heated, if required, to obtain the desired degree of plasticity, and applied as a plastic cement to articles composed of amorphous carbon or of graphite. The cemented structure may be maintained at a temperature of about 60° to 225° C. for a few hours, until the cement has assumed a permanent set, but this heating step is not essential, because resinification will take place at ordinary temperatures, although more slowly. Bonded structures formed in this manner exhibit a physical strength at the bonded surfaces which is usually greater than the physical strength of the amorphous carbon or graphite articles, and the structure as a whole exhibits elasticity, toughness, and imperviousness to chemicals to a degree not obtainable by the use of bonding materials hitherto known or used for like purposes.

It will be evident that, if desired, a plasticizer may be incorporated with the resinous furan material, and that any suitable catalyst may be substituted in whole or in part for sulfur chloride, without departing from the spirit of the invention.

I claim:

1. Composite article comprising at least two molded carbon members bonded with a cement containing essentially a resinified furan of the group consisting of furfural, furfuryl alcohol, and mixtures thereof.

2. Composite article comprising at least two molded carbon members bonded with a cement containing essentially sulfur chloride and a resinified furan of the group consisting of furfural, furfuryl alcohol, and mixtures thereof.

3. Composite article comprising two carbon members bonded together by a resin cement, one of said members being porous and the other member being composed of baked carbon the pores of which are substantially filled with a resinified liquid furan, and said cement containing essentially a resinified furan of the group consisting of furfural, furfuryl alcohol, and mixtures thereof.

4. Composite article comprising two carbon members bonded together by a resin cement, one of said members being composed of porous baked carbon and the other member being composed of baked carbon the pores of which are substantially filled with a resinified furan of the group consisting of furfural, furfuryl alcohol, and mixtures thereof; and said cement being composed essentially of a resinified furan of the group consisting of furfural, furfuryl alcohol, and mixtures thereof.

5. Composite article comprising at least two porous baked carbon members bonded together by a resin cement containing essentially a resinified furan of the group consisting of furfural, furfuryl alcohol, and mixtures thereof.

6. Composite article comprising two carbon members bonded together by a resin cement, both of said members being composed of baked carbon the pores of which are substantially filled with a resinified furan of the group consisting of furfural, furfuryl alcohol, and mixtures thereof; and said cement containing essentially a resinified furan of the group consisting of furfural, furfuryl alcohol, and mixtures thereof.

7. Composite article comprising members, at least one of which is a carbon member, bonded with a resinified furan of the group consisting of furfural, furfuryl alcohol, and mixtures thereof, and having the property of wetting carbon and forming with carbon a chemically resistant bond.

EDWIN F. KIEFER.